July 5, 1949.    G. HERZOG    2,475,137
RADIOLOGICAL WELL LOGGING
Filed March 21, 1945    2 Sheets-Sheet 2
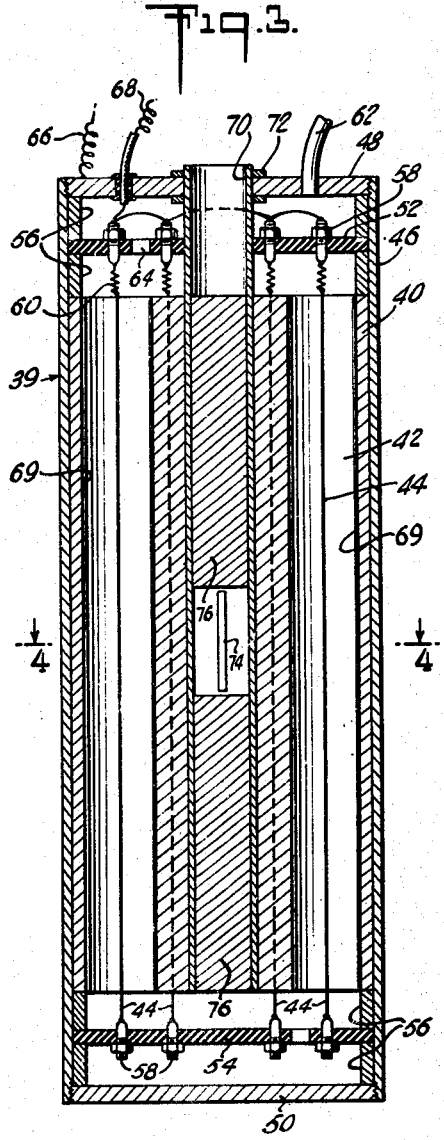
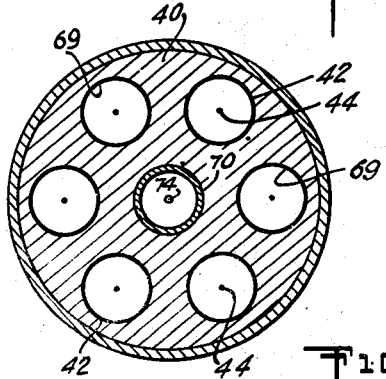
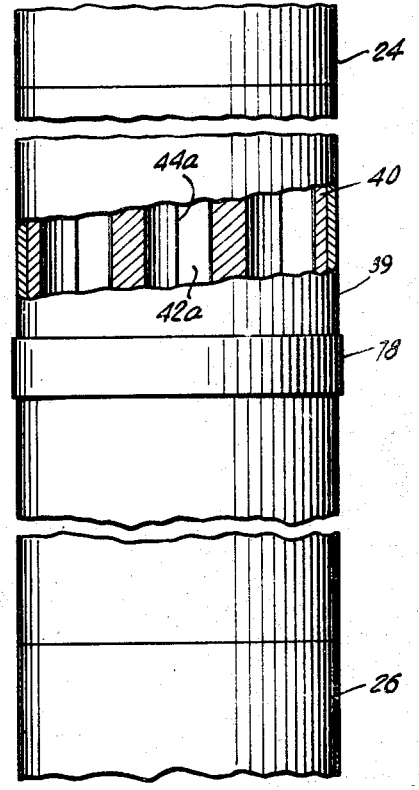
INVENTOR.
GERHARD HERZOG.
BY
ATTORNEY.

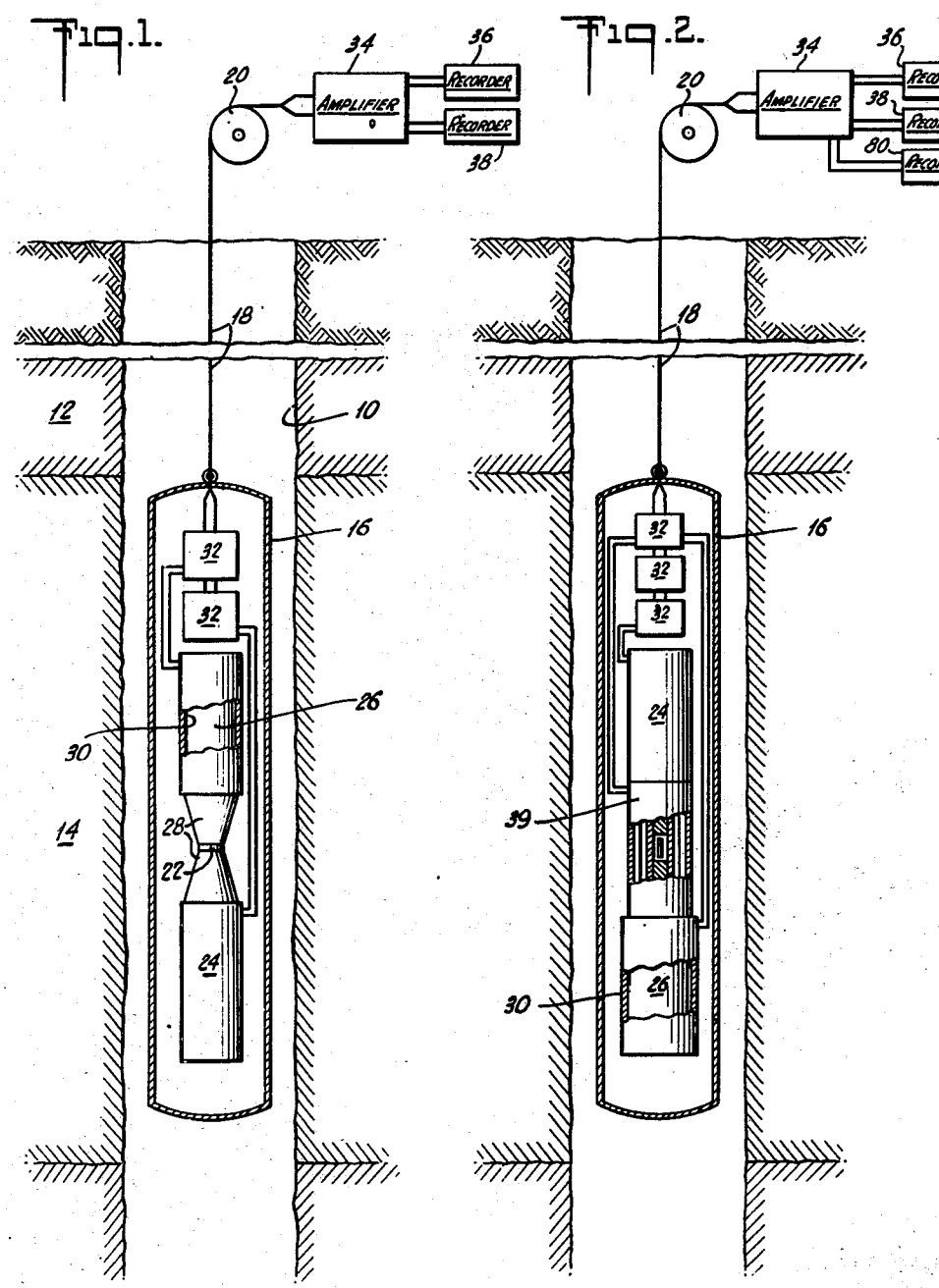

Patented July 5, 1949

2,475,137

UNITED STATES PATENT OFFICE 2,475,137

RADIOLOGICAL WELL LOGGING

Gerhard Herzog, Houston, Tex., assignor to The Texas Company, New York, N. Y., a corporation of Delaware Application March 21, 1945, Serial No. 583,908

11 Claims. (Cl. 250—83.6)

This invention relates to radiological well logging and more particularly to that form of logging of formations traversed by a bore hole in which a source of radioactivity such as a mixture of radium and beryllium is passed through the hole and a record made of the effect of the bombardment of the formations by penetrative radiation from the source.

The principal object of the invention is to provide a method and an apparatus by means of which accurate records may be obtained of the intensity of the gamma rays liberated in the formations by the neutron bombardment and the gamma rays from the source scattered in the formations and returned to the vicinity of the source in the hole, as well as a record of the intensity of the neutrons which are scattered in the formations and returned to the hole, these records being correlated with the depth of the logging instrument in the hole.

In this type of radiological well logging which requires a source of neutrons in the hole and three detectors each responsive to a different form of radiation, it is very difficult to arrange the three detectors close enough to the radiation source to register the radiation returning to the hole from the surrounding formations and still to have each detector responsive only to the desired type of radiation. Thus it has been found that by placing two gamma ray detectors or counters at opposite sides of the source and each detector separated from the source by a layer of material capable of absorbing direct radiation from the source and by providing one of the detectors with a thin shield or sleeve surrounding its vertical side, the unshielded detector will register both the gamma rays scattered in the formations and returned to it and gamma rays liberated in the formations by the neutron bombardment and passing toward the detector and, of course, gamma rays due to the natural radioactivity of the formations, while the shielded detector will register only the higher energy gamma rays, i. e., those liberated in the formation by the neutron bombardment plus substantially the same amount of "natural" gamma rays. Since the intensity of the "natural" gamma rays registered by each detector will be substantially the same, the effect of these rays need not be discussed further. By subtracting the response of the shielded detector from the unshielded detector a record may be had of the variations in the scattered radiation as the instrument passes through the hole.

It has also been found that utilizing a special form of neutron detector such as is disclosed in the co-pending application of K. C. Crumrine, Serial Number 511,516, filed November 24, 1943, now U. S. Letters Patent No. 2,462,471, granted February 22, 1949, in which the cathode of the counter is formed of a block of gamma ray absorptive material such as lead, the source of neutrons can be placed within or around the middle of the neutron detector and the latter then placed between the two gamma ray detectors so as to take the place of the direct gamma radiation shields or absorbers.

In the following description the expressions "neutron-gamma ray log," "gamma ray-gamma ray log" etc., are used for brevity to describe the types or forms of the primary radiation and the secondary, i. e., liberated or scattered radiation. For example "neutron-gamma ray" indicates that neutrons from a source cause gamma rays to be liberated from the surrounding formations and it is these gamma rays which are detected and measured. Likewise, "gamma ray-gamma ray" indicates that gamma rays from the source are scattered and then detected and measured.

For a better understanding of this invention reference may be had to the accompanying drawing in which:

Fig. 1 is a vertical sectional view elevation through a bore hole containing an instrument for providing a neutron-gamma ray log and a gamma ray-gamma ray log of the hole.

Fig. 2 is a similar view but in which a neutron detector is included in the instrument, Fig. 3 is a vertical sectional view through one form of neutron detector, Fig. 4 is a sectional view taken on the line 4—4 of Fig. 3, and Fig. 5 is a vertical view partly in section showing another modification in which the neutron source is mounted in a band or ribbon around the middle of the neutron detector.

Referring to the drawing a bore hole 10 is shown as traversing several underground formations such as those indicated at 12 and 14.

The hole 10 may or may not contain a well casing since the results will be substantially the same regardless of whether or not a casing is present. Within the hole 10 is a sealed housing 16 which will be called hereinafter the "logging instrument" and which is suspended on a cable 18 preferably containing one or more electrical conductors and passing over a measuring device 20 at the surface so that the depth of the instrument in the hole will be known at all times. Within the housing 16 is a source 22 of neutrons and gamma rays such as a mixture of radium and beryllium, and vertically and symmetrically disposed at opposite sides of the source are a pair of gamma ray detectors 24 and 26. While the instruments 24 and 26 may comprise any suitable form of gamma ray detector it is preferred that they be constructed as counters of the type disclosed in the co-pending application of D. G. C. Hare, Serial Number 412,617, filed September 27, 1941, now U. S. Letters Patent No. 2,397,071, granted March 19, 1946, as these instruments have proven to be many times more efficient than the other known types of gamma radiation detectors. Between the source 22 and the near end of each detector or counter is a layer of gamma ray absorptive material 28 of high density such as lead, gold or tungsten which prevents direct radiation from the source 22 from reaching the detectors. Neutrons and gamma rays from the source 22 pass outwardly into the surrounding formations, some of the gamma rays being scattered in the formations and returned toward the detectors while other gamma rays liberated in the formations by the neutron bombardment also pass into the hole toward the detectors. Some of the scattered and the liberated gamma rays will strike the detector 24 wherein electrical pulses will be generated the number of which will be in accordance with the intensity of the radiation detected. The other detector 26 is surrounded by a layer or sleeve 30 of a gamma ray absorptive material sufficiently thick to absorb the scattered gamma rays passing toward that detector and sufficiently thin to permit the passage to the detector of liberated gamma rays. Thus by subtracting the output of the detector 26 from the output of the detector 24 a record may be had of the intensity of the scattered gamma rays from the formations. Each detector is connected to a separate preamplifier 32 and the output of the preamplifier is lead upwardly through the cable 18 to a suitable amplifier 34 at the surface. The cable 18 may be made up of several electrical conductors in order that the signal output of each preamplifier can be conducted separately to the surface and in order that the necessary electrical power can be conducted downwardly from a supply, not shown, at the surface to the instrument in the bore hole. Instead of using this form of signal transmission it may be preferred to use a cable which contains a single insulated conductor surrounded by a conducting sheath. The signals from the preamplifiers can be transmitted through such a cable and then separated at the surface in various ways. For example, modulated carrier waves of various frequencies may be used together with proper filtering circuits or individual pulses may be transmitted which differ in size and/or polarity and which can be separated or "unscrambled" at the surface by proper filtering means.

Regardless of what system of signal transmission is utilized, it is understood that the amplifier 34 will pass on to the recorders 36 and 38 signals corresponding to the responses of the individual detectors 24 and 26, or signals representing a combination of these detector outputs.

With the arrangement described two logs can be simultaneously made when the instrument is passed through the hole, one of these logs being a curve or record of the variations in the intensity of gamma rays scattered within the formations and returned to the vicinity of the source and the other being a curve or record of the intensity of the gamma rays liberated in the formations and also returned to the vicinity of the source. As stated hereinbefore, each log will, of course, also include gamma rays due to the natural radioactivity of the formations.

In Figure 2 is illustrated a modification which as far as the making of the neutron-gamma ray log and the gamma ray-gamma ray log is concerned is substantially the same as that described with reference to Figure 1. However, a neutron detector is also disposed in the housing by means of which a third log may be obtained showing the variations in intensity of neutrons scattered in the formations and returned to the hole which log will provide information regarding the formations not obtainable through the use of the other logs, for example, the relative hydrogen content of the various formations. Those parts or elements shown in Figure 2 which correspond to the elements of Figure 1 are shown with the same reference characters. Thus a pair of gamma ray detectors or counters 24 and 26 are provided, one of these, i. e., counter 26 being surrounded with a layer of a gamma ray absorptive material which is sufficiently thick to absorb the gamma rays scattered within the formations and passing toward the detector 26. Each of the detectors 24 and 26 is connected to a separate preamplifier 32, the outputs of which pass upwardly through the cable 18 to an amplifier 34. Instead of using the direct gamma radiation shields 28 as is shown in Figure 1, this shielding is obtained by means of a neutron detector shown more clearly in Figures 3 and 4 and which detector occupies substantially the same space as the shields 28.

The neutron detector is very similar to that in the aforementioned patent of K. C. Crumrine and comprises essentially a block 40 of gamma ray absorptive material such as lead provided with a plurality of vertically disposed parallel holes 42. Through the center of each of the holes 42 is disposed a wire 44, these wires being connected together to form the anode of the detector while the block 40 forms the cathode. The cathode block 40 is mounted within a suitable housing or case 46 containing end plates 48 and 50 and intermediate discs or plates 52 and 54 of insulating material separated from the end plates and from the block by means of separator rings 56. The discs 52 and 54 are provided with small bolts 58 in alignment with the centers of the holes 42 and between these bolts are stretched the anode wires 44. Preferably small tension springs 60 are disposed between the bolts and the anode wires so as to maintain the latter under a desired constant tension. The upper end plate 48 is provided with a small tube through which a suitable gas is placed within the housing 46, the disc 52 also being provided with a small hole 64 to permit the gas to pass into the space within the cathode block. Electrical connections to the cathode and anode are made as shown at 66 and 68.

In the preferred form of the invention the holes 42 are lined with a coating 69 of a suitable neutron-reactive material preferably a compound of boron or lithium, such for instance as boron carbide. Although various gases such as air, argon, nitrogen, a mixture of argon and petroleum ether, etc., can be used to fill a counter of this type; hydrocarbon gas such as methane has been found very satisfactory. Instead of using the coating 69 a neutron-reactive gas such as boron-trifluoride may be used as the filling for the counter or a combination of coating and boron-trifluoride may be used if desired.

So far the detector which has been described is the same as that disclosed in the afore-mentioned Crumrine patent and the main difference between the two detectors is that in place of the center hole in the detector in the Crumrine patent a thin walled tube 70 is used, this tube passing through the cathode block 42 and upwardly through the insulating disc 52 and the upper plate 48 from which it is sealed as indicated at 72. At about the center of the tube 70 a source of neutrons and gamma rays 74 is mounted and above and below the source are disposed elongated plugs 76 of the same material as the cathode block 42. It will be seen that neutrons from the source 74 can easily pass outwardly through the material of the detector while gamma rays originating in the source and scattered in the surrounding formations and returned toward the detector will be absorbed in the material forming the cathode block 40 so that they will not be registered by the detector. While some of the primary gamma rays originating in the source 74 may be absorbed in the block 40 before they reach the formations, these primary rays have considerably greater energy than the scattered rays and consequently many of them will pass more or less horizontally through the cathode block 40 to reach the earth's formations. However, the neutron detector is, of course, considerably longer in the vertical direction than its width in the horizontal direction and there will thus be a sufficient amount of the cathode material and of the material in the plugs 76 between the source 74 and the inner ends of the gamma ray detectors 24 and 26 to absorb substantially all of the primary gamma rays passing directly toward the gamma ray detectors. In this manner the material of the block 40 in addition to absorbing scattered gamma rays also performs the function of the shield members 28 of Figure 1 which is to prevent primary gamma radiation from the source reaching the gamma ray detectors.

The neutrons which are scattered in the surrounding earth formations and returned toward the neutron detector pass readily through the material of the cathode block 40 and strike the neutron reactive coating 69 lining the inner surfaces of the block 40 whereupon alpha rays may be ejected from the coating to ionize the gas filling of the detector. In the other type in which no coating 69 is used but instead, a filling of a neutron-reactive gas such as boron-trifluoride, the alpha rays are ejected directly from the gas to cause the ionization.

In the modification shown in Figure 5 the neutron detector 39 is substantially the same as the detector disclosed in the aforementioned Crumrine patent and contains an additional center hole 42a. The cathode block 40 and the remaining parts of the detector are the same as have been described with reference to Figures 3 and 4. Instead of placing the neutron source at the center of the cathode block of the detector this source is distributed in a ribbon or band 78 which surrounds the vertical sides of the detector at its middle. It will be seen that, as is the case with the detector shown in Figures 3 and 4, primary gamma rays originating in the source 78 and passing toward the gamma ray detectors 24 and 26 are absorbed by the material forming the cathode block 40 before they can reach the inner ends of the gamma ray detectors. The action of the device shown in Figure 5 as a neutron detector is the same as that described with reference to the form shown in Figure 3, i. e., the neutrons from the source 78 scattered in the surrounding earth formations and back toward the detector pass readily through the material of the cathode block 40 to strike either a neutron-reactive coating on the inner surface of the cathode block or a neutron-reactive gas filling the detector so as to cause ionization within the detector.

The signals from the three detectors 24, 26 and 39 or rather the preamplified signals from these detectors will be passed upwardly over the cable 18 in any suitable manner, as has been mentioned with reference to the form disclosed in Figure 1. With reference to the form shown in Figure 2, however, an additional recorder 80 is connected to the amplifier 34 so that a record may be made of the responses of the neutron detector 39.

From the foregoing it will be seen that in the modification shown in Figures 2 through 5 applicant has provided a logging instrument by means of which three separate and distinct logs or records of the earth's formations can be obtained, namely, a neutron-gamma ray log, a gamma ray-gamma ray log, and a neutron-neutron log. Thus by passing only one logging unit through the hole 10 information regarding the earth's formations can be obtained which would otherwise require the passing of three different instruments through the hole in order to make three separate logs.

Obviously many modifications and variations of the invention as hereinbefore set forth may be made without departing from the spirit and the scope thereof but only such limitations should be imposed as are indicated in the appended claims.

I claim:

1. A method of logging bore holes which comprises passing a source of neutrons and gamma rays through the hole and simultaneously and separately measuring gamma rays liberated by the neutrons in the formations around the hole and said liberated gamma rays and gamma rays from the source scattered in said formations and returned to the hole in proximity to said source.

2. A method of determining the nature and location of the formations traversed by a bore hole which comprises passing through said hole a source of neutrons and gamma rays whereby neutrons and gamma rays penetrate said formations, some of the gamma rays being scattered and returned to the bore hole and other gamma rays being liberated by the penetrating neutrons and passing into the bore hole, measuring simultaneously and separately said liberated gamma rays and said liberated and said scattered gamma rays entering the bore hole in proximity to said source, and correlating said measurements with the depth of the source in the hole.

3. A method of determining the nature and location of the formations traversed by a bore hole which comprises passing through said hole a source of neutrons and gamma rays whereby neutrons and gamma rays penetrate said formations, some of the gamma rays being scattered and returned to the bore hole and other gamma rays being liberated by the penetrating neutrons and passing into the bore hole, while some of the neutrons are scattered in the formations and returned to the hole, and measuring simultaneously and separately the liberated gamma rays, the neutrons, and the liberated and the scattered gamma rays entering the hole in proximity to said source.

4. A method of determining the nature of the formations traversed by a bore hole which comprises passing through said hole a source of neutrons and gamma rays and a pair of radiation detectors separated vertically by said source, whereby neutrons and gamma rays penetrate said formations some of the gamma rays being scattered and returning to the bore hole and other gamma rays being liberated in the formations by said neutrons so as to pass into said hole, and measuring by one of said detectors both the scattered and the liberated gamma rays reaching the vicinity of the source and simultaneously therewith measuring by the other detector liberated gamma rays reaching the vicinity of the source to the exclusion of said scattered gamma rays.

5. A method of determining the nature of the formations traversed by a bore hole which comprises passing through said hole a source of neutrons and gamma rays and a plurality of radiation detectors, whereby neutrons and gamma rays from said source penetrate said formations, some of the gamma rays being scattered and returning to the bore hole and other gamma rays being liberated in the formations by said neutrons so as to pass into said hole, while some of the neutrons are scattered in the formations and returned to the bore hole, and measuring by one of said detectors said scattered neutrons, by another detector said liberated gamma rays and by another detector both scattered and liberated gamma rays, all of said measurements being made simultaneously.

6. A method of determining the nature and location of the formations traversed by a bore hole which comprises passing through said hole a source of neutrons and gamma rays whereby neutrons and gamma rays penetrate said formations, some of the gamma rays being scattered and returned to the bore hole and other gamma rays being liberated by the penetrating neutrons and passing into the bore hole while some of the neutrons are also scattered in the formations and returned to the hole, measuring simultaneously and separately the liberated gamme rays, the scattered neutrons and the liberated and the scattered gamma rays entering the bore hole in proximity to said source, and correlating said measurements with the depth of the source in the hole.

7. A device adapted to be passed through a bore hole to determine the nature and location of formations traversed by said hole comprising an elongated housing, said housing enclosing a source of neutrons and gamma rays, a detector of high energy gamma rays, a detector of high and low energy gamma rays and a detector of neutrons, said first and second named detectors being disposed vertically at opposite sides of said source and said neutron detector being disposed horizontally opposite said source, means associated with said neutron detector for shielding said first and second named detectors from direct gamma radiation from said source, and means for simultaneously recording the outputs of said detectors.

8. A device adapted to be passed through a bore hole to determine the nature and location of formations traversed by said hole comprising an elongated housing, a detector of high energy gamma rays, a detector of high and low energy gamma rays and a neutron detector having a cathode and an anode and disposed vertically in said housing, said gamma ray detectors being separated by said neutron detector, a source of neutrons and gamma rays disposed substantially at the center of said neutron detector, the cathode of said neutron detector being formed of a material capable of absorbing direct gamma radiation passing from said source toward said gamma ray detectors, and means for simultaneously recording the outputs of all of said detectors.

9. A device adapted to be passed through a bore hole to determine the nature and location of formations traversed by said hole comprising an elongated housing, a detector of high energy gamma rays, a detector of high and low energy gamma rays and a neutron detector having a cathode and an anode and disposed vertically in said housing, said gamma ray detectors being separated by said neutron detector, a source of neutrons and gamma rays disposed in a band surrounding said neutron detector substantially at its center, the cathode of said neutron detector being formed of a material capable of absorbing gamma rays from said source passing toward said gamma ray detectors, and means for simultaneously recording the outputs of all of said detectors.

10. A device adapted to be passed through a bore hole to determine the nature and location of formations traversed by said hole comprising an elongated housing, a detector of high energy gamma rays, a detector of high and low energy gamma rays and a neutron detector disposed vertically in said housing, said gamma ray detectors being separated by said neutron detector, said neutron detector comprising a cathode block of a material highly absorbent of gamma rays and transparent to neutrons and a plurality of anode wires disposed along the axes of holes arranged in parallel through said cathode block, and a source of neutrons and gamma rays disposed substantially midway between the upper and lower ends of said block, the arrangement being such that the material of said block will shield said gamma ray detectors from direct gamma radiation from said source.

11. A device adapted to be passed through a bore hole to determine the nature and location of formations traversed by said hole comprising an elongated housing, a detector of high energy gamma rays, a detector of high and low energy gamma rays and a neutron detector disposed vertically in said housing, said gamma ray detectors being separated by said neutron detector, said neutron detector comprising a cathode block of a material highly absorbent of gamma rays and transparent to neutrons and a plurality of anode wires disposed along the axes of holes arranged in parallel through said cathode block, a source of neutrons and gamma rays disposed substantially midway between the upper and lower ends of said block, the arrangement being such that the material of said block will shield said gamma ray detectors from direct gamma radiation from said source, said neutron detector being responsive to neutrons slowed down in bombarding said formations and returned to said neutron detector, said detector of high energy gamma rays being responsive to gamma rays liberated in said formations due to said neutron bombardment and said detector of high and low energy gamma rays being responsive both to said liberated gamma rays and to gamma rays from said source scattered in said formations, and means for simultaneously recording the outputs of said detectors.

GERHARD HERZOG.

REFERENCES CITED

The following references are of record in the file of this patent:

UNITED STATES PATENTS

| Number | Name | Date |
| --- | --- | --- |
| 2,345,119 | Hare | Mar. 28, 1944 |
| 2,374,197 | Hare | Apr. 24, 1945 |
| 2,397,661 | Hare | Apr. 2, 1946 |